United States Patent [19]

Hess

[11] 4,037,494
[45] July 26, 1977

[54] METHOD OF PRODUCING A RADIAL ARM-TYPE MEAT GRINDER CUTTER BLADE

[75] Inventor: Charles W. Hess, Schiller Park, Ill.

[73] Assignee: Speco, Inc., Schiller Park, Ill.

[21] Appl. No.: 690,199

[22] Filed: May 26, 1976

Related U.S. Application Data

[62] Division of Ser. No. 659,941, Feb. 20, 1976, Pat. No. 3,993,255.

[51] Int. Cl.² .............................................. B21K 1/76
[52] U.S. Cl. .................................................. 76/101 A
[58] Field of Search ...................... 76/101 A; 241/82.5

[56] References Cited

U.S. PATENT DOCUMENTS

| 431,230 | 7/1890 | Leopold | 241/82.5 |
|---------|--------|---------|----------|
| 849,329 | 4/1907 | Colthar | 76/101 A |
| 2,914,103 | 11/1959 | Ferris | 241/82.5 |

*Primary Examiner*—Harold D. Whitehead
*Assistant Examiner*—Roscoe V. Parker
*Attorney, Agent, or Firm*—Norman H. Gerlach

[57] ABSTRACT

A method of producing a radial arm-type cutter blade for a rotary meat grinder by way of certain particular successive operations involving stamping a blank to provide a plurality of radially and horizontally extending blank arms, bending the leading side marginal portions of the arms upwardly and outwardly along radial lines between the leading and trailing side edges of the arms, and shearing the outer side edge regions of the outwardly and upwardly bent leading side marginal portions of the arms.

3 Claims, 10 Drawing Figures

U.S. Patent  July 26, 1977  Sheet 2 of 2  4,037,494
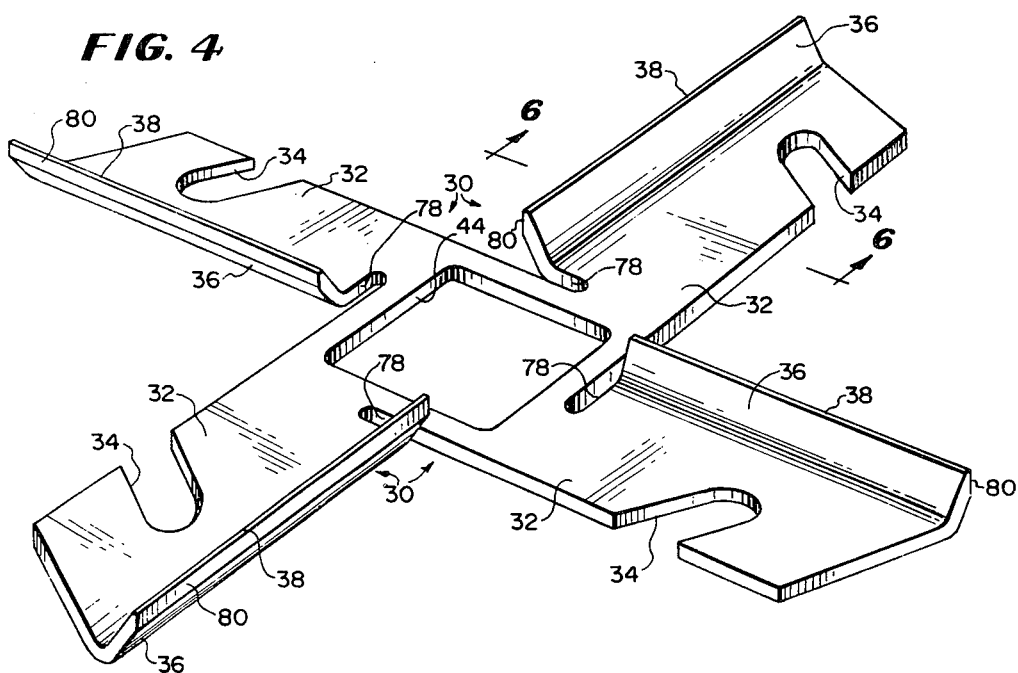
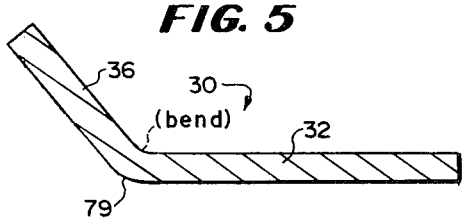
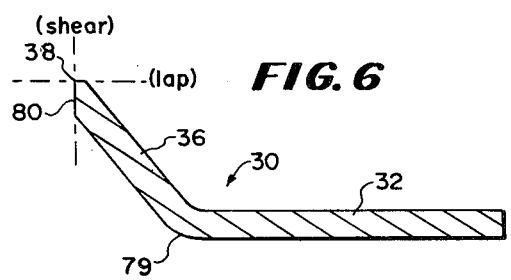
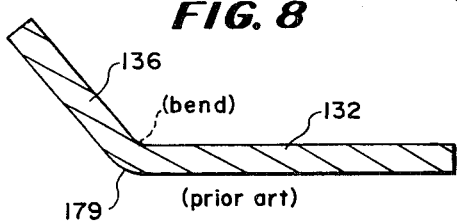
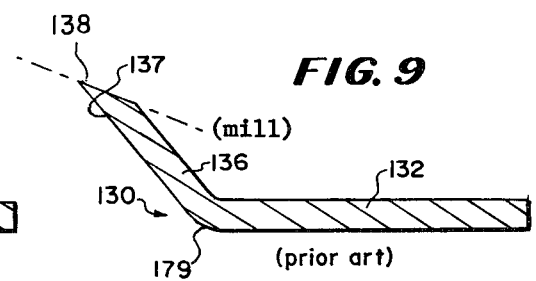

METHOD OF PRODUCING A RADIAL ARM-TYPE MEAT GRINDER CUTTER BLADE

This application is a division of my pending patent application Ser. No. 659,941, filed on Feb. 20, 1976, and originally entitled "MEAT GRINDER CUTTER BLADE OF THE RADIAL ARM TYPE AND METHOD OF MAKING THE SAME", now U.S. Pat. No. 3,993,255, granted to me on Nov. 23, 1976, and entitled "MEAT GRINDER CUTTER BLADE OF THE RADIAL ARM TYPE."

The present invention relates generally to rotary meat grinders and has particular reference to a novel radial arm type cutter blade which, due to the particular manner in which its knife edges are formed, effects in cooperation with its associated perforated grinder plate a more efficient grinding operation that is accomplished by a conventional cutter blade. A conventional cutter blade of the type under consideration herein is provided on its radial arms with sharp knife edges which sweep across the various perforations in the associated grinder plate in such manner as to produce a shearing action on the meat product moving rearwards through the grinder casing in response to rotation of the usual motor-driven worm, thus producing small meat particles which are forced rearwardly through the grinder plate perforations under the influence of the pressure of the oncoming meat product. However, the leading edges of the cutter blade arms which terminate in such sharp knife edges slant in such a direction that there is a marked tendency for the sheared meat fragments to oppose the direction of the oncoming meat product by a camming action and as each meat fragment is sheared against the remote or trailing portion of the edge of a given perforation, such fragment, instead of immediately passing through the next following or succeeding perforation, tends to be impelled forwards and back into the oncoming meat product. The latter, however, due to its superior force or pressure prevails and the net result is that many of the sheared meat fragments, instead of immediately being forced through the grinder plate perforations, are subjected to such a swirling action that they do not pass through the grinder plate near the point of shear, but instead, at some future time after a certain amount of distortion are pressed through the grinder plate perforations which are far remote from the particular knife edge which initially effected their shearing. This results in the meat product being ground being subjected to a mixing or beating action which is undesirable and impairs the product of the ground meat, it being understood that an ideally ground meat product is comprised of fairly uniform size meat particles instead of being in a relatively mashed condition.

The present invention is designed to overcome the abovenoted limitations that are attendant upon the construction and use of a conventional meat grinder cutter blade and, toward this end, it contemplates the provision of a novel cutter blade the arms of which do not taper to sharp thin line knife edges, but instead, have relatively thin planar edge surfaces which ride flat against the associated perforated grinder plate and ordinarily would be regarded as blunt knife edges except for the fact that their leading edges are rectangularly sharp and have associated therewith forwardly extending flat or planar meat-impelling surfaces which extend at a right angle to the grinder plate so that, instead of exerting a forward camming action on the sheared meat fragments, they impel the sheared fragments in such manner with respect to the associated grinder plate that the oncoming meat product immediately forces them, without altering their chunk-like shape, through the next following or succeeding perforations. Thus, the swirling of sheared meat fragments around the inner face of the perforated grinder plate before entry thereof through the perforations is effectively avoided. This results in a more uniform and somewhat "granular" meat product rather than a mashed meat product which is normally considered as being not highly acceptable or palatable.

Although conventional meat grinder cutter blades, as well as the present novel meat grinder blade, are both capable of fabrication from a blank of flat sheet metal by sequential punch press operations which in themselves involve ordinary and well-known punch press technology, the present meat grinder blade is manufactured by certain simple sequential operations which, considered collectively, result in a substantially completed item, ready for immediate use in a meat grinder, such operations therefore being considered to be novel and to constitute a novel and improved method which constitutes the principal object of the invention.

Numerous other objects and advantages of the invention not at this time enumerated will readily suggest themselves as the nature of the invention is better understood from a consideration of the following detailed description.

The invention consists in the several novel features which are hereinafter described and are more particularly defined by the claim at the conclusion hereof.

In the accompanying two sheets of drawings forming a part of this specification, there are illustrated a meat grinder cutter blade embodying the invention and the method whereby the blade is manufactured.

In these drawings:

FIG. 4 is an enlarged rear perspective view of the cutter blade;

FIG. 5 is an enlarged sectional view taken transversely through one of the radial arms of the blank of FIG. 2 and showing an initial bend which is formed in the production of the improved cutter blade;

FIG. 6 is a sectional view similar to FIG. 5 but illustrating schematically a subsequent shearing operation which is made in the production of the novel cutter blade and also showing schematically a lapping or grinding operation which completes the cutter blade, the view actually being a transverse section on line 6—6 of FIG. 4;

FIG. 8 is a sectional view identical to FIG. 5 but showing an initial bend which is made in the production of a prior art cutter blade which is currently in use;

Figure 7:
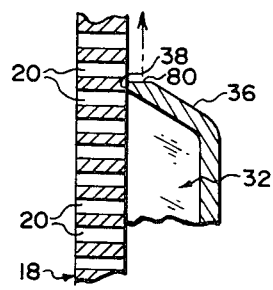
FIG. 7 is a fragmentary transverse sectional view taken through the distal or outer end of one of the arms of the improved cutter blade, illustrating schematically its shearing action in connection with an adjacent portion of the associated perforated grinder plate.
Figure 10:
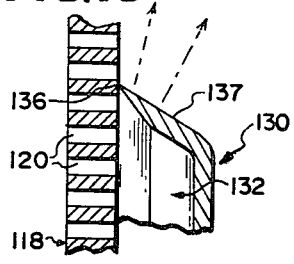

FIG. 9 is a sectional view similar to FIG. 8 but illustrating schematically a subsequent milling operation which is made in producing the illustrated prior art cutter blade; and FIG. 10 is a sectional view similar to FIG. 7 but illustrating schematically the shearing action which takes place in connection with the prior art cutter blade of FIGS. 8 and 9 and an adjacent portion of the associated perforated grinder plate.

Figure 1:
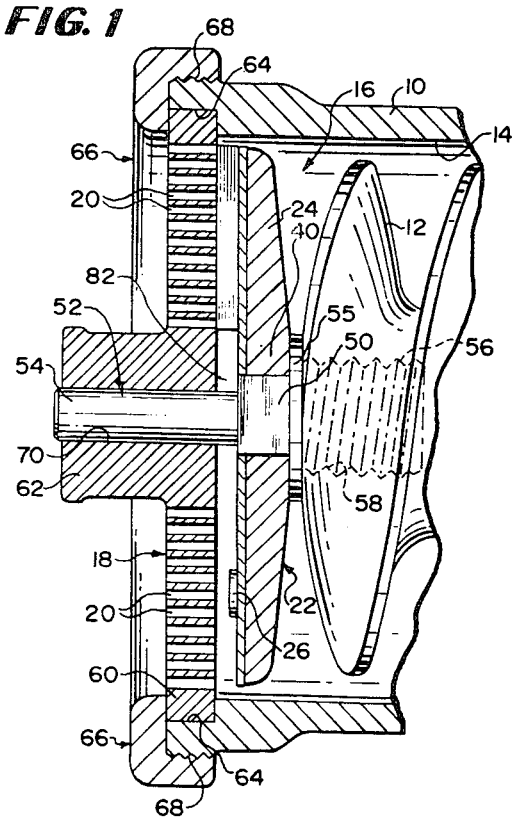
FIG. 1 is a vertical longitudinal fragmentary sectional view, taken through the rearward or discharge end of a conventional rotary meat grinder having mounted thereon a cutter blade which is made according to the particular method constituting the present invention.

Referring now to the drawings in detail and in particular to FIG. 1, a conventional rotary meat grinder embodying a cutter blade as made by the particular method constituting the present invention is fragmentarily illustrated, only the rearward or discharge end of the grinder being shown for purposes of expediency. The grinder involves in its general organization a horizontally extending tubular grinder casing 10 which embodies at its front or receiving end (not shown) the usual upstanding infundibular hopper (also not shown) through which chunks of meat are fed downwardly to the interior of the casing 10 as a preliminary to horizontal pick-up and feed by a horizontally positioned rotatable worm 12. The latter is disposed coaxially in the grinder casing and serves when driven to conduct the meat chunks rearwardly through a cylindrical meat channel 14 first past a rotary cutter assembly 16 and then against a stationary perforated grinder plate 18 having a multiplicity of transverse perforations 20 formed therein. Such perforations, in combination with the cutter assembly 16, shear the meat chunks into small fragments which are forced rearwardly through the perforations 20 and are then collected in a suitable receptacle (not shown) which may be positioned beneath the rear end of the meat grinder. It will be understood that the front end of the worm is provided with the usual coaxial and fixed worm shaft and that the latter is adapted to be driven by an electric motor or other power source. Since only the rear end region of the meat grinder is illustrated in the drawings, neither the aforementioned hopper nor the worm shaft appears in the drawings, but for a full disclosure of a grinder casing having such a hopper and worm shaft, reference may be had to U.S. Pat. No. 3,542,104, granted on Nov. 24, 1970, and entitled "MEAT GRINDER WITH PNEUMATICALLY BIASED RETAINING RING." It will be observed from such patent that in a conventional meta grinder, the worm shaft finds suitable support in the front wall of the grinder casing 10.

Figure 3:
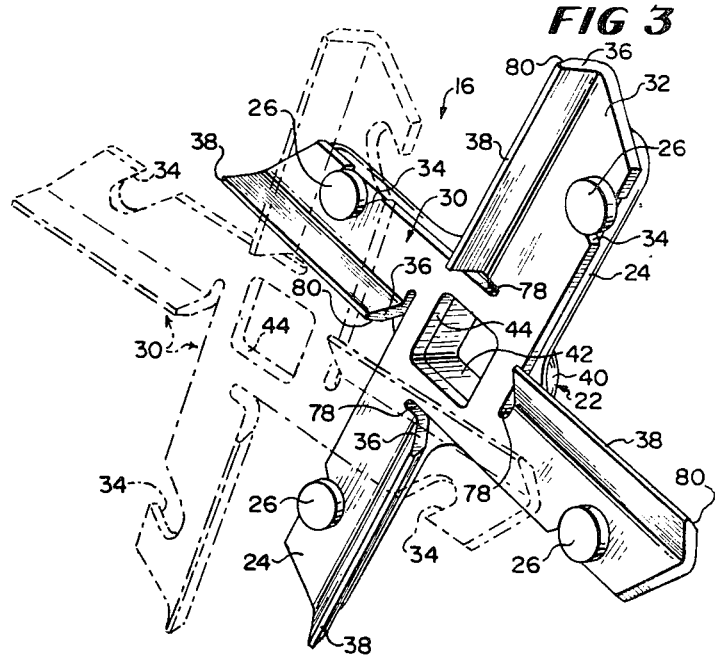
FIG. 3 is a rear perspective view of the cutter blade showing the same operatively applied to its associated backing member.

The rotary cutter assembly 16 is comprised of two parts, namely, a spider-like blade holder 22 having a series of four radial backing arms 24 (see FIG. 3), and a similarly shaped hardened steel cutter 30 having a series of four radial arms 32. The backing arms 24 of the blade holder 22 are slightly quadrilaterally offset so that opposite pairs of arms are not quite in longitudinal alignment. Such arms are provided with headed reaction or locating lugs 26 and these project outwardly and rearwardly from the rear faces of the arms 24. The four radial arms 32 of the cutter blade 30 are also similarly quadrilaterally offset. They overlie the backing arms 24 as shown in full lines in FIG. 3 and are provided in their trailing side marginal portions with notches 34 which interlock with the headed lugs 26. As will be described in greater detail presently, the leading edge regions or side marginal portions of the arms 32 of the cutter are bent or turned rearwardly and outwardly as indicated at 36 and afford knife edges 38 (see particularly FIG. 6) which bear against the forward planar face of the stationary perforated grinder plate 18 and cooperate with the perforations 20 in the plate for meat shearing purposes as is customary with rotary meat grinders of the character under consideration. Preferably, but not necessarily, the leading knife edge regions are bent or turned forwardly and outwardly at an angle of the order of 45°. The dotted line disclosure of the cutter blade 30 in FIG. 3 of the drawings illustrates the manner in which the two cutter assembly parts 22 and 30 may be assembled upon each other. Except for the outturned leading knife edge regions 36, the cutter blade member 30 is planar and lies flat against the blade holder 22.

The blade holder 22 of the rotary cutter assembly 16 is formed with a central hub portion 40 in which there is formed a square or other non-circular drive opening 42. The latter registers with a similarly shaped opening which is formed in the hub or central portion of the cutter blade 30. The square openings 42 and 44 are designed for reception therein of a square drive section 50 (see FIG. 1) which is formed on the medial region of an axially extending, one-piece or unitary pilot member 52. The latter embodies, in addition to the drive member 50, a rear pilot shaft proper 54, a cylindrical radially extending annular flange 55 immediately forwards of the drive section 50, and a relatively large diameter, externally threaded attachment plug 56. As shown in FIG. 1, such plug is threadedly received in an internally threaded socket 58 which is formed in the rear end of the worm 12. When the plug 56 is fully tightened in the socket 58 the forward face of the flange 55 abuts directly against the rear end face of the worm 12. Because the pilot member 52 is in effect fixedly attached to the worm when the plug 56 is screwed fully into the socket 58, and also because of the driving connection between the drive section 50 and the opening-defining surfaces in the central portions of the blade holder 22 and the cutter blade 30, the assembly rotates conjointly with the worm 12.

The perforated grinder plate 18 is of conventional construction and includes a circular body portion 60 within which the aforementioned shearing perforations 20 are provided, and also includes a rearwardly extending cylindrical hub portion 62. The peripheral region or rim of the circular casing 10 and is clamped in position therein by means of an internally threaded retainer ring 66 which is threadedly received over an external screw thread 68 on the rear end of the grinder casing 10. As shown in FIG. 1, the ring 66 is provided with a flange which extends radially inwards and engages the peripheral region of the grinder plate 18. The hub 62 is provided with a longitudinal or axial bore 70 in which the pilot shaft 54 of the pilot member 52 is journalled or rotatably mounted.

The general arrangement of parts thus far described is largely conventional, the novelty of the present invention residing in the particular character or design of the cutter blade 30 which differs from conventional cutter blades of similar design, as well as in the method by means of which it is formed by various stamping, shearing and lapping or grinding operations, all in a manner that will be set forth in detail subsequently.

The cutter blade 30 is adapted to be formed or shaped from a flat blank 72. The latter is shown in plan view in FIG. 2 of the drawings and is cut or stamped from flat horizontally positioned sheet or plate metal of predetermined thickness by a suitable punch press or other mechanism in order to produce four quadrilaterally arranged, radially extending blank arms 74 which are, in part, separated from a central hub portion 76 by narrow transversely extending slits 78, and also to produce the aforementioned square opening 44 in its central or hub portion. The aforementioned slits 78 intersect and extend inwards from the base regions of the leading side edges of the arms 74 of the blank 72 and terminate short of the base regions of the trailing side edges of said arms. As shown in FIG. 5, the second step in the method of forming the cutter blade 30 is a punch press or other operation which results in the creation of formation of an approximate 45° bend 79 (so labelled in FIG. 5) along a radial line in each of the blank arms 74. The radial bend lines are between or intermediate the leading and trailing side edges of the arms, extend at right angles to the slits 78 and result in the leading side marginal portions of the arms extending outwardly and upwardly at angles of the order of 45°. The next or third punch press or other operation consists in effecting in the outer side edge region of the outwardly and upwardly bent leading side marginal portion of each blank arm 74 a shear at right angles to the plane of the unbent portions trailing side marginal portion of the blank arm 74 of the blank 72 and along the vertical dotted line (labelled shear in FIG. 6) in order to establish a flat, inner, meat-pushing surface 80 and also remove sufficient metal to leave a flat, narrow, outer surface. The flat, inner, meat-pushing surface 80 of the bent leading side marginal portion of each blank arm 74 extends vertically and at right angles to the plane of the unbent trailing side marginal portion of the blank arm. The latter flat outer surface of the bent leading side marginal portion of each blank arm extends horizontally and in parallel relation with the unbent trailing side marginal portion of said blank arm, is adapted to engage flatly the inner surface of the perforated grinding plate of the meat grinder in which the cutter blade is used, and extends at right angles to the surface 80; and may then be ground or lapped on the horizontal dotted line (labelled "lop" in FIG. 6) to a high degree of flatness, thus creating for each arm 32 of the cutter blade 30 the aforementioned knife or shearing edge 38 which possesses a small transverse dimension and, therefore, is not sharp but which nevertheless is effective for shearing purposes in connection with the perforations 20 in the associated grinder plate 18 in a manner that will be made clear presently. As shown in FIG. 4, the flat narrow, outer surfaces are coplanar and of less width than the surfaces 80. After the aforementioned lapping operation, they join said flat surfaces 80 in such manner that the knife or shearing edges 38 are right angle edges. The particular punch press equipment for effecting in the arms 74 the aforementioned bends, shears and laps in order to produce or form the ultimate cutter blade 30 has not been disclosed herein since a single punch press or successive punch presses together with a suitable lapping or grinding machine may readily be designed by any competent tool and die maker to perform the required or necessary steps or functions.

The net result after such punch press operations have been completed is disclosed in FIG. 4 and consists of the cutter blade 30 which has heretofore been described in detail and the operation of which is schematically illustrated in FIG. 7 of the drawings. By referring to FIG. 7, it will be apparent that the blunt but flatly lapped knife edge 38 of each arm 32 is of less width than the diameter of the perforations 20 and rides flat against the forward face of the perforated grinder plate 18 and also that the meat shearing operation takes place between the leading right angular edge of the flatly lapped knife edge of each cutter blade arm and the various perforations 20 which it encounters during sweeping of the various arms 32 in the leading direction of movement of the cutter blade 30. The meat fragments which are sheared by the right angular edges of the knife edges 38 of the arms 32 are forced in the leading direction of the rotary cutter blade 30 as shown by the dotted line arrow in FIG. 7 and the pressure of the oncoming meat chunks resulting from operation or rotation of the worm 12 forces such sheared meat fragments through the next adjacent perforations. There are no forces on the sheared meat fragments which tend to oppose the direction of the oncoming meat chunks.

The present cutter blade 30 and its method of construction are to be distinguished from a conventional cutter blade such as that which is disclosed fragmentarily in FIGS. 8, 9 and 10 and is identified by the reference numeral 130. Said last mentioned views are similar to FIGS. 5, 6 and 7 and, therefore, in order to avoid needless repetition of description, similar reference numerals but of a higher order have been applied to the corresponding parts of the cutter blade 130 of FIGS. 8, 9 and 10.

Figure 2:
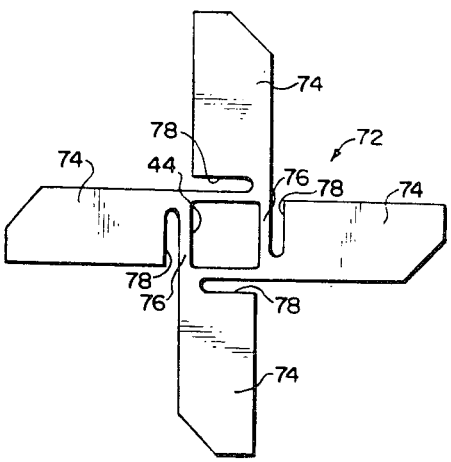
FIG. 2 is a plan view of the blank from which the improved cutter blade is formed.

In the prior art cutter blade 130, the flat blank therefor remains the same as the blank 72 of FIG. 2, as also does the initial 45° bend 179 in each of the arms 132 as shown in FIG. 8. However, the knife edge 138 of each arm 132 of the cutter blade 130 is knife sharp by reason of the mill line shown in dotted lines in FIG. 9 and so labelled, such line being inclined and formed by a milling operation, and establishing the sharp knife edge 138 and a leading face 137 which has a tendency to force the meat product forwardly against the oncoming meat chunks. Although the oncoming chunks are overpowering, nevertheless the efficiency of passage of meat fragments through the perforations 120 in the associated grinder plate 118 is impaired. This forward force against the oncoming meat chunks is shown by the dotted-line arrows in FIG. 10 and should be compared with the circumferential application of force to the meat fragments as shown by the dotted-line arrow in FIG. 7.

The invention is not to be limited to the exact sequence of steps as shown in the accompanying drawings or described in this specification as various changes in the details of the improved method may be resorted to without departing from the spirit or scope of the invention. Therefore, only insofar as the invention is particularly pointed out in the accompanying claim is the same to be limited.

Having thus described the invention what I claim as new and desire to secure by letters patent is:

1. The method of producing a radial arm-type cutter blade for a rotary meat grinder, which comprises the steps of stamping a blank from a horizontally disposed sheet of flat metal of predetermined thickness so as to provide a plurality of flat radially and horizontally extending blank arms which are, in part, separated from the central hub part by narrow slits which intersect and extend rearwards from the base regions of the leading side edges of the arms and terminate short of the base regions of the trailing side edges of said arms, while at the same time providing a non-circular drive opening in the hub part, bending the leading side marginal portions of the arms upwardly along radial lines between the leading and trailing side edges of the arms and at right angles to the slits in order that they extend outwardly and upwardly at angles of the order of 45°, and then shearing the outer side edge regions of the outwardly and upwardly bent leading side marginal portions of the arms so as to form flat, inner, meat-pushing surfaces which extend vertically and at right angles to the plane of the unbent trailing side marginal portions of the arms, and flat, outer surfaces which are coplanar, extend horizontally and in parallel relation with said unbent trailing side marginal portions of the arms, are adapted to engage flatly the inner surface of the perforated grinder plate of the meat grinder in which the cutter blade is used, extend at right angles to the inner meat-pushing surfaces, and join the latter in right-angle shearing edges.

2. The method of claim 1 and wherein the shearing step is such that the flat outer surfaces are of less width than the flat, inner meat-pushing surfaces.

3. The method of claim 1 and including as an additional and final step lapping the flat outer surfaces.

* * * * *